(No Model.)
F. MEYER, Jr.
BALANCE.
No. 292,935. Patented Feb. 5, 1884.
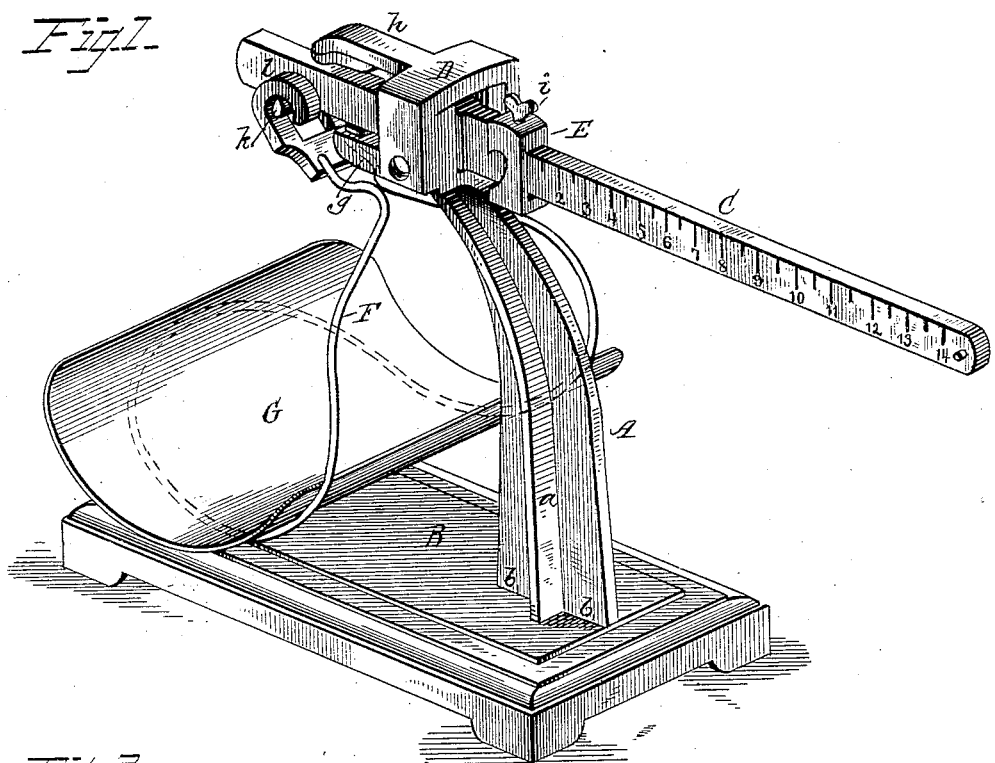
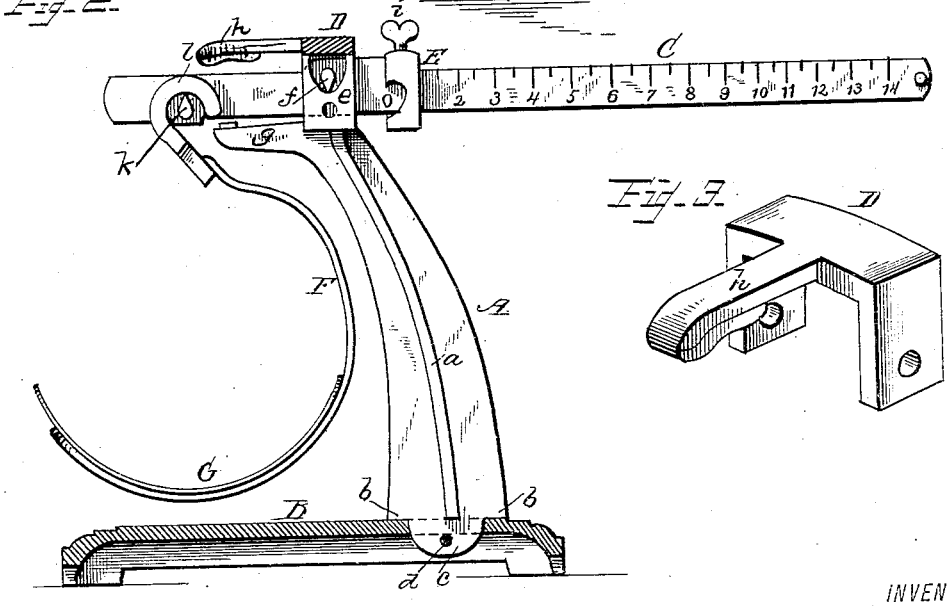
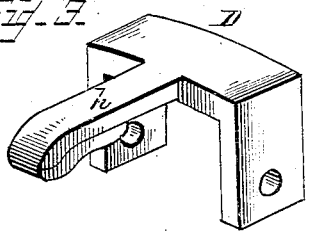
WITNESSES
Franck L. Ourand
N. E. Oliphant
INVENTOR
Fredrick Meyer Jr.
per Chas. H. Fowler,
Attorney

United States Patent Office.

FREDRICK MEYER, JR., OF NEWARK, NEW JERSEY.

BALANCE.

SPECIFICATION forming part of Letters Patent No. 292,935, dated February 5, 1884.

Application filed December 13, 1883. (No model.)

*To all whom it may concern:*

Be it known that I, FREDRICK MEYER, Jr., a citizen of the United States, residing at Newark, in the county of Essex and State of New Jersey, have invented certain new and useful Improvements in Balances; and I do hereby declare that the following is a full, clear, and exact description of the same, reference being had to the annexed drawings, making a part of this specification, and to the letters and figures of reference marked thereon.

Figure 1 of the drawings is a perspective view of my invention; Fig. 2, a side elevation, partly in section; and Fig. 3, a detail perspective view of the removable stop-cap.

This invention relates to certain new and useful improvements in balances, but more particularly to that class of such devices usually employed for determining the weight or amount of tobacco in individual cigars, or for weighing letters, tea-samples, or other products where accuracy in determining the weight is essential, and for which an extremely sensitive balance is therefore necessary.

The object of the present invention is to provide a balance adapted for the uses described above, that will be simple, inexpensive, and durable in its construction, extremely sensitive, free from undue friction, and not liable to get out of order, while at the same time the employment of a check secured in the base to steady the pan or plate and prevent its displacement is obviated, said check having been found objectionable on account of its causing strain and false leverage, thereby interfering with the sensitiveness of the balance.

The invention therefore consists in the general construction and arrangement of the several parts, as will be hereinafter more fully described with reference to the accompanying drawings.

In the drawings, A represents the column or standard of my improved balance, formed with webs $a$ at right angles to its horizontal plane, and is cut away at its lower end to form shoulders $b$ and a lug, $c$, said lug entering a slot in the base B, to which it is keyed by a pin, $d$, the webs $a$ and shoulders $b$ giving the column or standard four points of bearing on this base, thus rendering it perfectly firm when in its keyed position, said webs also adding to its strength, with a saving in material. The upper end of this column or standard is formed with bearings $e$ for the knife-edged projections $f$ of a beam, C, and also with an under stop, $g$, for said beam.

Removably secured to the bearing portion of the column or standard A is a cap, D, for covering and protecting this portion of the balance, said cap having an extension, $h$, which forms the over-stop for the beam C, said beam being provided with poise E, having a set-screw, $i$, by which it may be held in any desired place along the beam, this beam being also suitably graduated for different systems or units of weight, the graduations in this instance being for pennyweights. The forward end of this beam C is provided with knife-edged projections $k$, on which are hung the hooks $l$ of a pendulum-cradle, F, said hooks being preferably formed in one piece and the cradle from a single piece of wire. This pendulum-cradle F forms the support for a pan or plate, G, and the column or standard A being curved substantially as shown, a free play is given to said cradle and pan or plate, while from the fact of the cradle having a knife-edge connection with the beam, with no check to its motion, the same is comparatively free from friction or false leverage, and the entire balance is thus made very free and sensitive, and has a quick, positive, and accurate motion, well adapted for determining the exact weight of delicate substances.

Having now fully described my invention, what I claim as new, and desire to secure by Letters Patent, is—

1. A suitable base provided with a slot, in combination with a column or standard constructed substantially as described, and keyed to said base, a balance-beam provided with knife-edge projections having their bearing in said column or standard, and similar projections, forming a bearing for a pendulum cradle or pan, and a removable cap for the column or standard, having an extension forming a stop for the beam, as and for the purpose specified.

2. A pendulum cradle or pan formed, preferably, from a single piece, and provided with hooks, also preferably formed in one piece, in combination with a scale-beam having knife-edge projections forming bearings for the hooks of the cradle or pan, and similar projections at its center of gravity, a curved right-angularly-webbed column or standard keyed to the base, and provided with beam-bearings and stop at its upper end, and a cap removably secured to said column or standard, and having an extension forming an over-stop for said beam, substantially as shown, and for the purpose described.

In testimony that I claim the above I have hereunto subscribed my name in the presence of two witnesses.

FREDRICK MEYER, JR.

Witnesses:
   FRANK. L. MEYERS,
   RICHARD WEBER.